Figure 1:
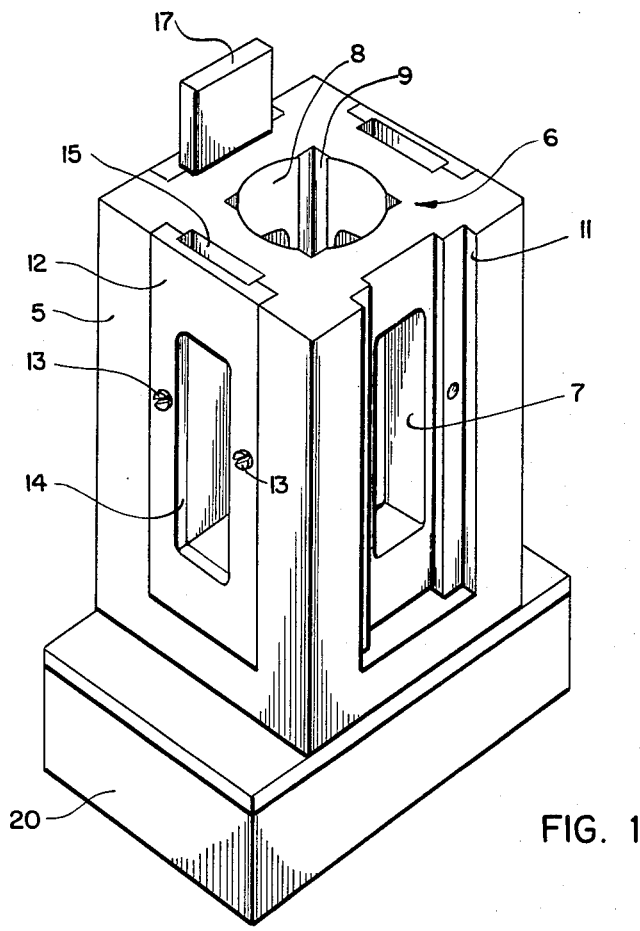

United States Patent
Spyropoulos

[15] 3,695,772
[45] Oct. 3, 1972

[54] SAMPLE CELL HOLDER FOR RADIANT ENERGY ANALYZERS

[72] Inventor: Constantine G. Spyropoulos, Westwood, Calif.

[73] Assignee: Beckman Instruments Inc.

[22] Filed: Nov. 16, 1970

[21] Appl. No.: 89,901

[52] U.S. Cl. .................................................. 356/246
[51] Int. Cl. ............................................. G01n 1/10
[58] Field of Search......356/244, 246, 102, 103, 104, 356/208; 23/253, 256, 259

[56] References Cited

UNITED STATES PATENTS

| | | | |
|---|---|---|---|
| 3,527,542 | 9/1970 | Pennasi et al. | 356/246 X |
| 3,551,062 | 12/1970 | Brown | 356/244 X |
| 3,554,648 | 1/1971 | Boostrom et al. | 356/246 X |
| 3,234,846 | 2/1966 | Cropper et al. | 356/208 X |
| 2,549,574 | 4/1951 | Condiff | 356/246 |
| 3,205,764 | 9/1965 | Letter | 356/246 |

OTHER PUBLICATIONS

Edmonds, " Ultrasonic Absorption Cell for Normal Liquids" Rev. Scientific Instruments, v. 37, No. 3, Mar., 1966, pp. 367– 368

*Primary Examiner*—Ronald L. Wibert
*Assistant Examiner*—F. L. Evans
*Attorney*—Paul R. Harder and Robert J. Steinmeyer

[57] ABSTRACT

A sample cell holder for radiant energy analyzers is provided having four apertures as mutual right angles therein. A longitudinal cell receiving opening is provided which is defined by arced wall portions along the apertures and right-angle corner portions located said way between the apertures to support both circular and square sample cells therein. Removable aperture plates are provided over each aperture and form a channel between the aperture plate and the main cell body for receiving beam modifying means over each aperture. The cell is also provided with conduits for thermostatting fluid.

8 Claims, 2 Drawing Figures

PATENTED OCT 3 1972

3,695,772

INVENTOR.
CONSTANTINE G. SPYROPOULOS
BY
Paul R. Harder
ATTORNEY

SAMPLE CELL HOLDER FOR RADIANT ENERGY ANALYZERS

This invention relates to the field of radiant energy analysis and more particularly to a sample cell holder for use in radiant energy analyzers.

In the field of spectral analysis various differing requirements are placed upon a sample cell holder depending upon the particular analysis being performed. A variety of different kinds and sizes of cells are used, as, for example, circular cells, square cells, microcells and flow cells. Each of these type cells place specific requirements upon the sample cell holder. In the typical spectral analysis it is common practice to pass radiant energy through the sample and determine the amount of energy absorbed by the sample at a given wavelength. The radiation may be scanned over a wide range of wavelengths. In fluorescent analysis it is common practice to direct excitation energy into the sample along one beam path and to observe the radiant energy emitted by the sample along another beam path. These beam paths are typically at right angles although angles as small as 10° from the incident beam path have been used in surface fluorescence studies. In certain spectral experiments, fluorescent experiments, and particularly for kinetic studies it is desired to maintain the sample at a precise predetermined temperature. This requires thermostatting of the cell which has generally been accomplished by placing the cell within a thermostatted cell holder. Further, depending upon the particular cell and experiment being performed it is generally desirable to provide different size apertures adjacent the cell to define the beam path, to provide beam reflecting devices to enhance the radiation, or to provide other beam modifying devices in the beam path.

It is the principal object of this invention to provide a sample cell holder for use in radiant energy analyzers which is readily adaptable to a variety of experiments and which can handle a plurality of different kinds and sizes of cells.

Another object of the invention is to provide a sample cell holder wherein the beam paths therethrough may be readily modified and which can accommodate various beam defining apertures and beam modifying devices.

Figure 2:
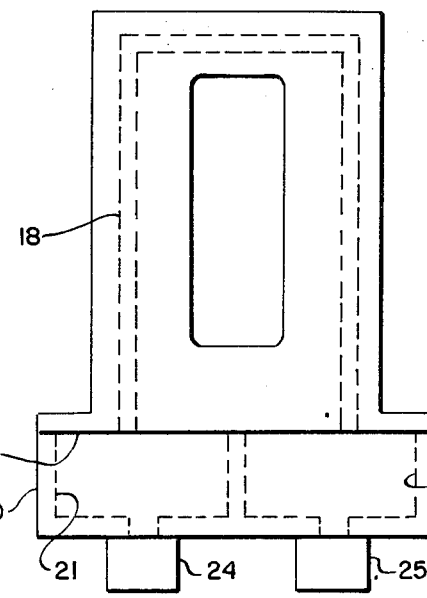

Further objects and many of the attendant advantages of this invention will become more readily apparent as the same becomes better understood by a consideration of the following detailed description when read in connection with the accompanying drawing and wherein:

FIG. 1 is an isometric view of a sample cell holder constructed in accordance with the teachings of this invention; and FIG. 2 is a partial plan view of the sample cell holder of FIG. 1 illustrating the thermostatting features of the sample cell holder.

Referring now to FIG. 1 the sample cell holder comprises a main body member of any suitable material such as metal or epoxy or any other rigid material and having a longitudinal opening therein, generally designated at 6, for receiving and supporting a sample cell within the cell holder. Four apertures, one of which is illustrated at 7, extend between the outer surface and the longitudinal opening in the body member, the apertures on adjacent surfaces of the body member being at mutually perpendicular angles. Opposite pairs of these apertures thus form first and second beam paths through the body member at right angles, the apertures being arranged such that the axis of both beam paths are transverse to the longitudinal opening and pass through the axis thereof at right angles.

The longitudinal opening 6 is defined preferably at least partially by circular wall portions each subtending an arc of less than 90°, being diametrically opposed and located such that the apertures 7 pass therethrough. Thus, these circular wall portions are adapted to receive and support a circular sample cell having an outer surface of the same diameter and support this sample cell such that its longitudinal axis is at right angles to the axis of the beam paths passing therethrough. The longitudinal opening 6 is further defined by four right angle corner wall portions 9, one right angle wall portion being located midway between each of the apertures to hold a square sample cell at its corners and support the sample cell such that its flat sides are parallel to the apertures 7 and perpendicular to the axis of the beam path passing therethrough.

In the outer surface of main body 5 and extending about each of the apertures is a recess 11, one of which is illustrated on the drawing, which is adapted to receive a removable aperture plate 12 which may be secured to the main body member 5 by screws 13. The aperture plates are provided with beam defining apertures therethrough, one of which is shown at 14, which are located on the axis of the beam path and may correspond in size to the aperture 7 passing through the main body member or, if desired, may be made smaller to define the size of the beam path passing through the sample cell. It may be desirable to provide several aperture plates with a variety of beam defining apertures 14 therein for use with the main body member 5. In certain instances the aperture may be omitted from aperture plate 12 if it is desired to totally block one or more of the apertures 7 of the main body although, as hereinafter described, other means may also be provided for blocking this beam path.

The aperture plate and mating portion of the main body member are formed to cooperate to provide a channel 15 therebetween extending from the upper, outer surface of the cell body to below the aperture 7 in the main body member and transverse to the beam path through the aperture for receiving a beam modifying device, one of which is illustrated at 17. Although in the preferred embodiment the channel is partially formed in the main body member 5 and aperture plate 12 it is obvious that it may be formed in either one alone. The beam modifying device 17 may take a variety of forms such, for example, as an opaque plate, a filter or a totally or partially aluminized surface for reflecting the beam incident thereon back into the sample cell.

The sample cell holder is readily adaptable to a variety of spectral experiments. For example, if a single beam path through the sample cell is needed and it is desired to block the unused apertures either a solid aperture plate 12 may be placed over the unused apertures or an opaque beam modifying member 17 slipped into the channel over the unused apertures. Over the one or both of the used apertures a beam modifying member consisting of a filter may be utilized if desired.

In utilizing the sample cell holder for fluorescent measurements excitation radiation is directed along one axis and fluorescent radiation measured along a different axis. If desired the apertures opposite the entrance and exit apertures may be blocked and, in certain circumstances, it may be desired to utilize a beam modifying member 17 with a reflecting surface opposite either the entrance of exit window or both to increase the intensity of the radiation along these paths. Again filters may be provided over one or both of the other apertures.

In certain spectral experiments, and in fluorescent experiments involving kinetic reactions, it is desired to maintain the sample at a predetermined temperature or to vary the temperature as a function of time. For this purpose the cell holder is provided with conduits running through the body through which a thermostatting fluid may be passed. By maintaining the cell body at a predetermined temperature or programming the cell body temperature the sample temperature may be maintained constant or programmed.

Referring now to FIG. 2 there is illustrated a plan view of one surface of the cell holder illustrating a conduit 18 passing from the lower outer surface of the body member through the body member and exiting again on the lower outer surface. Inlet and outlet conduit means may be directly connected to conduit 18 and a plurality of conduits may be provided within the cell to maintain a uniform temperature therethrough. In the preferred embodiment as illustrated in FIGS. 1 and 2 there is provided a base member 20 which is secured to the bottom of the main body of the cell holder. This base member has a pair of fluid reservoirs 21 and 22 with inlet and outlet couplings 24 and 25 connected to respective ones of these reservoirs. Conduit 18 passing through the main body member communicates with each of these reservoirs. Thus, the thermostatting fluid is passed through the inlet 24 to the inlet reservoir 21 through the conduit 18 and to the outlet reservoir 22 and through outlet 25.

There has been illustrated and described a sample cell holder which is adapted to receive a variety of sample cells and maintain these sample cells accurately within one or more beam paths. Aperture plates and beam modifying means are provided such that the cell may be readily adapted for a variety of spectral experiments lending the sample cell holder to more universal use. While the sample cell holder has been described in connection with the preferred embodiment illustrated in FIGS. 1 and 2 other embodiments and variations will be readily apparent to those skilled in the art.

What is claimed is:

1. A sample cell holder for use in radiant energy analyzers comprising:

a main body member having a longitudinal opening formed therein for receiving and supporting a sample cell;

first and second pairs of apertures extending through said body member to form first and second beam paths therethrough, said beam paths each having an axis transversely intersecting a longitudinal axis of said opening, the axis of said beam paths being at right angles to each other;

said longitudinal opening being at least partially defined by circular wall portions adjacent each aperture in said body and a right angle corner wall portion located midway between each of said apertures so that circular and square sample cells may be interchangeably supported within said opening.

2. The sample cell holder according to claim 1 wherein an aperture plate is removably secured to said body member over each of said apertures, at least two of said aperture plates having beam defining apertures therein.

3. The sample cell holder according to claim 2 wherein said beam defining apertures are substantially the same size and shape as the adjacent aperture in said body.

4. The sample cell holder according to claim 2 wherein said aperture plates and said body member cooperate to provide a channel therebetween extending transverse to said beam path for receiving beam modifying means within said beam paths.

5. The sample cell holder according to claim 4 further comprising at least one beam modifying means in at least one of said channels.

6. The sample cell holder according to claim 5 wherein said beam modifying means comprises an optical filter.

7. The sample cell holder according to claim 2 wherein said aperture plates and said body member cooperate to provide a channel therebetween extending transverse to said beam paths, beam modifying means in two of said channels on adjacent sides of said body member, said beam modifying means having flat reflecting surfaces facing said longitudinal opening whereby two beam paths at right angles are provided each having a reflecting surface at the end thereof.

8. The cell holder according to claim 5 further comprising at least one conduit extending through said main body member for circulating a temperature compensating fluid there-through.

a base member secured to said main body member and having a pair of fluid reservoirs therein, said conduit and said main body member communicating with each of said reservoirs, and fluid inlet and outlet means communicating with respective ones of said reservoirs.

* * * * *